United States Patent
Payot et al.

(10) Patent No.: US 9,580,901 B2
(45) Date of Patent: Feb. 28, 2017

(54) OPTIMIZED PATTERN OF A DAMPING LAYER FOR WALL, FLOOR, AND CEILING CONSTRUCTIONS

(71) Applicant: SAINT-GOBAIN PERFORMANCE PLASTICS CHAINEUX, Chaineux (BE)

(72) Inventors: Sylvain Payot, Shanghai (CN); Georges Moineau, Battice (BE); Benjamin Mardaga, Waremme (BE); Ahmet Comert, Herve (BE)

(73) Assignee: SAINT-GOBAIN PERFORMANCE PLASTICS CHAINEUX, Chaineux (BE)

( * ) Notice: Subject to any disclaimer, the term of this patent is extended or adjusted under 35 U.S.C. 154(b) by 0 days.

(21) Appl. No.: 14/688,719

(22) Filed: Apr. 16, 2015

(65) Prior Publication Data
US 2015/0218804 A1    Aug. 6, 2015

Related U.S. Application Data

(63) Continuation of application No. 13/730,688, filed on Dec. 28, 2012, now Pat. No. 9,033,102, and a
(Continued)

(51) Int. Cl.
*E04B 1/84*   (2006.01)
*B32B 7/12*   (2006.01)
(Continued)

(52) U.S. Cl.
CPC ............. *E04B 1/8409* (2013.01); *B32B 7/12* (2013.01); *E04B 1/82* (2013.01); *E04B 1/8209* (2013.01);
(Continued)

(58) Field of Classification Search
CPC ..... E04B 1/82; E04B 1/84; E04B 1/86; E04B 1/8209; E04B 1/8409; E04B 2001/8263;
(Continued)

(56) References Cited

U.S. PATENT DOCUMENTS 2,014,694 A  *  9/1935  Olschner .............. E04B 1/8409
                                                        181/292
2,286,527 A  *  6/1942  Yerkey .................. B22D 25/04
                                                        164/260
(Continued)

FOREIGN PATENT DOCUMENTS

| | | | |
|---|---|---|---|
| JP | KR 101326490 B1 * | 11/2013 | |
| KR | WO 2012047045 A2 * | 4/2012 | ............. E04B 1/86 |
| WO | 2010/042993 A1 | 4/2010 | |

OTHER PUBLICATIONS

The International Search Report received from the European Patent Office for International Application No. PCT/EP2012/077040, dated Mar. 5, 2013, 1 page.

*Primary Examiner* — Jeanette E Chapman
(74) *Attorney, Agent, or Firm* — Abel Law Group, LLP; Thomas Osborn (57) ABSTRACT

An acoustic damping article includes a substrate, wherein the substrate has a surface area S. The acoustic composition further includes a polymer resin. The polymer resin coats partially the surface area with a set of areas. The ratio of the coated areas over the surface area S is less than 1 and the polymer resin coverage is not greater than about 500 g/m$^2$. Embodiments of the present disclosure include an acoustic damping article including a release liner; and an acoustic damping composition disposed on the release liner. The acoustic damping composition partially coats the release liner, and the acoustic damping composition has a Patterned Interlayer Stiffness of at least about 1 GN/m$^3$.

19 Claims, 9 Drawing Sheets

Related U.S. Application Data continuation-in-part of application No. 13/631,054, filed on Sep. 28, 2012, now abandoned.

(60) Provisional application No. 61/582,326, filed on Dec. 31, 2011, provisional application No. 61/542,140, filed on Sep. 30, 2011.

(51) Int. Cl.
  *E04B 1/82* (2006.01)
  *E04B 1/86* (2006.01)

(52) U.S. Cl.
  CPC .................. *E04B 1/84* (2013.01); *E04B 1/86* (2013.01); *E04B 2001/8263* (2013.01); *E04B 2001/8461* (2013.01); *E04B 2001/8466* (2013.01)

(58) Field of Classification Search
  CPC ..... E04B 2001/8461; E04B 2001/8466; B32B 7/12
  See application file for complete search history.

(56) References Cited

U.S. PATENT DOCUMENTS

| | | | | |
|---|---|---|---|---|
| 3,073,412 A | * | 1/1963 | Carter | E04B 1/8409 181/293 |
| 3,424,270 A | | 1/1969 | Hartman et al. | |
| 3,621,934 A | * | 11/1971 | Thrasher | E04B 1/8409 181/290 |
| 3,851,724 A | * | 12/1974 | Banks, Jr. | E04B 1/8409 181/208 |
| 4,237,178 A | * | 12/1980 | Mazaki | B32B 15/14 181/290 |
| 5,103,614 A | | 4/1992 | Kawaguchi et al. | |
| 5,281,470 A | * | 1/1994 | Kobayashi | B32B 27/14 252/62.9 R |
| 5,438,806 A | * | 8/1995 | Reinhall | E04B 1/8409 52/167.1 |
| 5,543,193 A | | 8/1996 | Tesch | |
| 5,584,950 A | | 12/1996 | Gaffigan | |
| 5,587,564 A | * | 12/1996 | Stief | G10K 11/172 181/286 |
| 5,691,037 A | | 11/1997 | McCutcheon et al. | |
| 5,939,179 A | * | 8/1999 | Yano | B32B 15/08 428/212 |
| 5,965,851 A | * | 10/1999 | Herreman | G10K 11/168 181/200 |
| 6,145,617 A | | 11/2000 | Alts | |
| 6,210,767 B1 | * | 4/2001 | Knauf | C09J 7/0228 428/314.2 |
| 6,309,985 B1 | | 10/2001 | Virnelson et al. | |
| 7,181,891 B2 | | 2/2007 | Surace et al. | |
| 7,603,824 B1 | | 10/2009 | Hartanto | |
| 7,705,101 B2 | | 4/2010 | Sherman et al. | |
| 7,745,005 B2 | | 6/2010 | Tinianov | |
| 7,798,287 B1 | | 9/2010 | Surace et al. | |
| 7,799,410 B2 | | 9/2010 | Tinianov | |
| 7,883,763 B2 | | 2/2011 | Tinianov | |
| 8,590,670 B1 | | 11/2013 | Grube et al. | |
| 2002/0028332 A1 | | 3/2002 | Pratt | |
| 2003/0141144 A1 | | 7/2003 | Wilson | |
| 2004/0048022 A1 | | 3/2004 | Pratt | |
| 2004/0219322 A1 | | 11/2004 | Fisher et al. | |
| 2005/0080193 A1 | | 4/2005 | Wouters et al. | |
| 2005/0196608 A1 | | 9/2005 | Wouters et al. | |
| 2006/0072372 A1 | * | 4/2006 | Thomas | B32B 5/16 367/1 |
| 2007/0275207 A1 | * | 11/2007 | Higgins | B32B 5/16 428/95 |
| 2008/0236943 A1 | * | 10/2008 | Zickell | E04B 1/8409 181/294 |
| 2008/0251198 A1 | | 10/2008 | Tinianov | |
| 2010/0038169 A1 | | 2/2010 | Lee | |
| 2010/0066121 A1 | | 3/2010 | Gross | |
| 2010/0126800 A1 | | 5/2010 | Albin, Jr. | |
| 2010/0180916 A1 | | 7/2010 | Colon et al. | |
| 2010/0230206 A1 | | 9/2010 | Tinianov et al. | |
| 2010/0258378 A1 | | 10/2010 | Ravnaas | |
| 2010/0261023 A1 | * | 10/2010 | Ravnaas | E04B 1/86 428/448 |
| 2011/0064916 A1 | | 3/2011 | Sherman et al. | |
| 2011/0096555 A1 | * | 4/2011 | Pires | B32B 17/10036 362/363 |
| 2011/0271638 A1 | | 11/2011 | Tierney et al. | |
| 2012/0024626 A1 | | 2/2012 | Coates et al. | |
| 2012/0058289 A1 | | 3/2012 | Coates et al. | |
| 2012/0115998 A1 | * | 5/2012 | Schumann | C08G 18/10 524/197 |
| 2013/0087409 A1 | | 4/2013 | Payot et al. | |
| 2014/0124291 A1 | * | 5/2014 | Dugan | E04B 1/84 181/290 |

\* cited by examiner

OPTIMIZED PATTERN OF A DAMPING LAYER FOR WALL, FLOOR, AND CEILING CONSTRUCTIONS

CROSS-REFERENCE TO RELATED APPLICATION(S)

This application claims priority under 35 U.S.C. §120 and is a continuation of U.S. patent application Ser. No. 13/730,688 entitled "OPTIMIZED PATTERN OF A DAMPING LAYER FOR WALL, FLOOR, AND CEILING CONSTRUCTIONS," by Payot et al., filed on Dec. 28, 2012, which claims priority under 35 U.S.C. §119(e) to U.S. Provisional Patent Application No. 61/582,326 entitled "OPTIMIZED PATTERN OF A DAMPING LAYER FOR WALL, FLOOR, AND CEILING CONSTRUCTIONS," by Payot et al., filed on Dec. 31, 2011. This application also claims priority under 35 U.S.C. §120 and is a continuation-in-part of U.S. patent application Ser. No. 13/631,054 entitled "OPTIMIZED PATTERN OF A DAMPING LAYER FOR WALL, FLOOR, AND CEILING CONSTRUCTIONS," by Payot et al., filed on Sep. 28, 2012, which claims priority under 35 U.S.C. §119(e) to U.S. Provisional Patent Application No. 61/542,140 entitled "OPTIMIZED PATTERN OF A DAMPING LAYER FOR WALL, FLOOR, AND CEILING CONSTRUCTIONS," by Payot et al., filed on Sep. 30, 2011. Each patent application cited herein is hereby incorporated by reference in its entirety.

FIELD OF THE DISCLOSURE

This disclosure, in general, relates to acoustic damping articles, construction materials formed using such acoustic damping articles, and methods of using acoustic damping articles.

BACKGROUND

Noise control has long been an issue in residential and business settings. With increasing urbanization and an increasing cost of real estate, individuals are living and working in closer proximity, increasing the need for noise reduction, particularly in high rise and apartment settings. To combat noise in such urban settings, several cities have implemented noise control building codes. Further, many building owners specify noise tolerance in construction specifications during construction.

However, many traditional methods for controlling noise are either cumbersome to install or ineffective. Particularly in the case of walls, traditional techniques include the use of resilient members disposed between a wall panel and a support. Such resilient members are often difficult to install and are expensive. Other traditional methods include the instillation of thick insulative members which have limited effectiveness and add additional steps to the installation and construction of walls or ceilings. Another method for modal damping factor includes laminating a viscoelastic material, such as QuietGlue® or Green Glue® between two constructions panels, e.g., drywall. However, one disadvantage for these materials is a long drying time the viscoelastic material as well as the cost associated with the amount of material to cover a panel.

As such, an improvement for acoustic damping article would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1A:
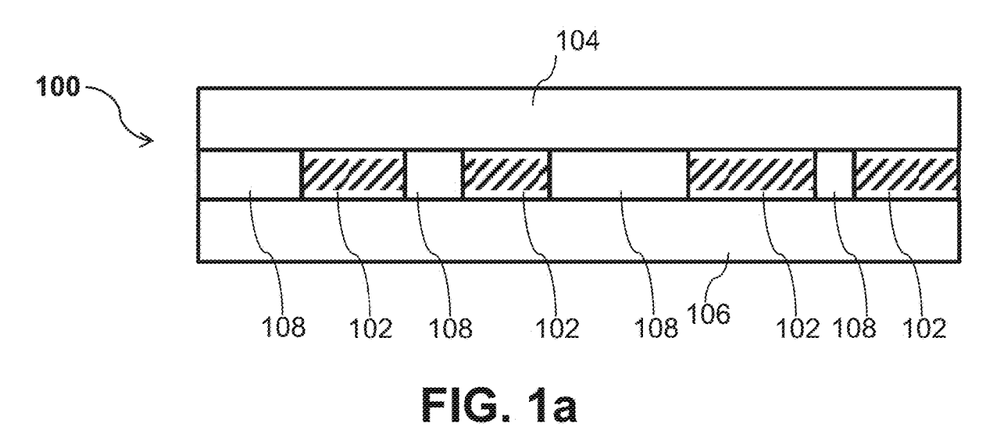
FIG. 1a. includes an illustration of an exemplary construction panel.

As illustrated in FIG. 1a, an acoustic damping article 100 can include a polymer resin 102 which can be partially disposed between a first rigid panel member 104 and a second rigid panel member 106. Since the resin is partially disposed, there are polymer resin-free spaces 108 between the two panels 104 and 106. In particular, when disposed between the two rigid panels (104 and 106), the polymer resin 102 may have a thickness of at least 10 microns, such as at least about 25 microns, at least about 50 microns, at least about 75 microns, at least about 100 microns, at least about 150 microns, at least about 200 microns, at least about 250 microns, at least about 300 microns, at least about 350 microns, at least about 400 microns, at least about 450 microns, at least about 500 microns, or at least about 1 millimeter. In another embodiment, the thickness of polymer resin 102 can be not greater than about not greater than about 5000 microns, such as not greater than about 4000 microns, not greater than about 2000 microns, not greater than about 1000 microns, not greater than about 800 microns, not greater than about 600 microns, not greater than about 500 microns, not greater than about 450 microns, not greater than about 400 microns, not greater than about 350 microns, or not greater than about 300 microns, not greater than about 100 microns, or not greater than about 50 microns.

In other instances the polymer resin 102 can have a thickness in a range from 25 micrometers to 5 millimeters, such as a range of 100 micrometers to 5 millimeters, a range of 500 micrometers to 5 millimeters, or even a range of 1 millimeter to 5 millimeters. The thickness of the resin-free spaces can be equal to the thickness of the polymer resin as illustrated in FIG. 1a. In other embodiments the thickness of the resin-free spaces can be different from the thickness of layer 102. For example, the resin-free spaces can have higher thickness than the layer 102. This can be accomplished, for example, by a rigid panel that has a pretreated surface with embossed channels or indentations in areas where the resin-free spaces are located.

In an example, the polymer resin 102 is formed from a monomer, such as an acrylic acid, an acrylate, a methyl methacrylate, ethyl methacrylate, methacrylate, methyl acrylate, ethyl acrylate, vinyl acetate, derivatives thereof, or any combination thereof.

In another example, the polymer resin 102 may be an acrylic resin. The acrylic resin may have an alkyl group having from 1-4 carbon atoms, a glycidyl group or a hydroxyalkyl group having from 1-4 carbon atoms. Representative acrylic polymers include polyacrylate, polymethyl methacrylate, polyethyl methacrylate, polybutyl methacrylate, polyglycidyl methacrylate, polyhydroxyethyl methacrylate, polymethyl acrylate, polyethyl acrylate, polybutyl acrylate, polyglycidyl acrylate, polyhydroxyethyl acrylate, or any combination thereof. In a particular example, the acrylic resin is in the form of an emulsion, such as a water-based emulsion. For example, the acrylic resin may be an adhesive acrylic resin, such as a pressure-sensitive adhesive acrylic resin.

In yet another example, the polymer resin 102 may include polyvinyl chloride, plasticized polyvinyl chloride, polyvinyl acetate, a derivative thereof, or a copolymer thereof. In a further example, the polyvinyl acetate may be modified, such as through hydroxylization to form a copolymer poly(vinyl acetate-co-vinyl alcohol).

In even one further example, the polymer resin 102 may include a polyurethane, an ethylene vinyl acetate, a polyolefin, a silicone, or any combination thereof.

In another embodiment, the polymer resin 102 can include a filler. The filler can be a liquid filler, a solid filler, or an elastic filler. In an example, the filler can be selected from rubber, barium carbonate, barium sulfate, calcium sulfate, alumina, or silica. The filler can be in form of fibers, granules, or random particles. The size of these particles can be chosen in order to match the desired final thickness of the polymer resin layer.

In particular, the polymer resin 102 can have a low glass transition of not greater than about 40° C. In an example, the glass transition temperature is not greater than about 35° C., such as not greater than 30° C., or not greater than 25° C.

In one embodiment, the shear modulus G' of the polymer resin 102 can be not greater than about 100 MPa at about 1000 Hz and at room temperature, such as not greater than about 80 MPa, not greater than about 70 MPa, not greater than about 60 MPa, not greater than about 50 MPa, or even not greater than about 40 MPa. In another example, the shear modulus G' of the polymer resin 102 can be at least about 0.2 MPa, such as at least 0.5 MPa, at least about 1 MPa, at least about 2 MPa, at least about 5 MPa, at least about 10 MPa, at least about 20 MPa, or even at least about 40 MPa.

In another embodiment, the acoustic damping article 100 includes a polymer resin 102 that has an inherent damping loss factor of at least about 0.4, such as at least about 0.5, at least about 0.6, at least about 0.7, at least about 0.8, at least about 0.9, or even at least about 1.

In another embodiment, it is also contemplated to fill the resin-free spaces 108 with material. Such material can be material such as polymers, foams, or fabrics. These materials can have the same function as the polymer resin, such as they can be sound absorbing or sound reducing, e.g., soft foam, fiberglass, or mineral wool. In another embodiment, the material filling the resin free space can have another function, e.g., heat insulation.

Alternatively, an additional discontinuous layer (not illustrated) of polymer resin may be applied to the second major surface of the rigid panel 106. Another rigid panel (not illustrated) may be applied in contact with the additional discontinuous layer of polymer to form a three rigid member panel with two acoustic composition layers.

The width of the layer 102 can vary and is dependent from the shape and/or pattern of the areas covered by the polymer resin. Likewise the width or volume of the resin-free spaces 108 can vary as well depending from the pattern or shapes used for the polymer resin coated areas. Therefore, one option for quantifying the of polymer resin applied to a rigid panel is by determining the percentage of area of the rigid panel coated and/or the mass of polymer resin covered per square meter ($m^2$).

In embodiments, the acoustic damping article includes a substrate having a surface area $S_t$. The polymer resin 102 coats partially the surface area $S_t$ with a set of n areas, $S_{c1} \ldots, S_{cn}$, wherein n≥1. The ratio of the coated areas $S_c$ over the surface area $S_t$ can be less than 1. The acoustic damping article has a polymer resin coverage on the surface area of not greater than about 500 $g/m^2$. In other embodiments, the polymer resin coverage may not be greater than about 450 $g/m^2$, such as not greater than about 400 $g/m^2$, not greater than about 350 $g/m^2$, not greater than about 300 $g/m^2$, not greater than about 250 $g/m^2$ not greater than about 200 $g/m^2$, not greater than about 180 $g/m^2$, not greater than about 150 $g/m^2$, or even not greater than about 120 $g/m^2$. In another embodiment, the polymer resin coverage may be at least about 20 $g/m^2$, such as at least about 30 $g/m^2$, at least about 40 $g/m^2$, at least about 50 $g/m^2$, at least about 60 $g/m^2$, at least about 70 $g/m^2$, at least about 80 $g/m^2$, at least about 90 $g/m^2$, at least about 100 $g/m^2$, at least about 150 $g/m^2$, or even at least about 200 $g/m^2$.

The coverage or the mass of polymer resin covered per $m^2$ can be determined, e.g., by determining the weight difference of the uncoated rigid panel or substrate and the coated rigid panel or substrate and dividing the weight difference by the total surface S area of the one or more sides that received coating. In a practical manner, the polymer resin is generally applied as a liquid or gel. The coverage is determined after the polymer resin has dried and all volatile additives, such as solvents, emulsifier, lubricants, etc. have dissipated until the weight of the coated panel or substrate is constant. Any coverage conceivable can be obtained.

In an embodiment, the percentage of area that coats the major surface of rigid panel 106 is the sum of all coated area $S_c$ over the surface area $S_t$ of the major surface of the rigid panel 106. Any percentage can be obtained. For example, the substrate or rigid panel 106 can be covered at about 5%, about 10%, about 15%, about 20%, about 25%, about 30%, about 35%, about 40%, about 45%, about 50%, about 60%, about 70%, about 80%, or even about 90%.

In another embodiment, the polymer resin 102 coats partially the surface area $S_t$ of panel 106 with a set of n areas, $S_{c1} \ldots, S_{cn}$, wherein n≥1 and the ratio of the coated areas $S_c$ over the surface area $S_t$ is less than 1. In another embodiment, the acoustic damping article can further include that a first shortest distance d1 between edges of two coated areas is not greater than about 35 mm. In an example, the acoustic damping article may have a first shortest distance not greater than about 30 mm, such as not greater than about 28 mm, not greater than about 25 mm, not greater than about 23 mm, not greater than about 20 mm, not greater than about 18 mm, not greater than about 15 mm, not greater than about 13 mm, not greater than about 10 mm, not greater than about 8 mm, or even not greater than about 5 mm.

In another example, the acoustic damping article can have a second shortest distance between edges of two coated areas. The second shortest distance may not be greater than about 40 mm, such as not greater than about 35 mm, not greater than about 30 mm, not greater than about 28 mm, not greater than about 25 mm, not greater than about 22 mm, not greater than about 20 mm, not greater than about 18 mm, or even not greater than about 15 mm.

In yet another example, the acoustic damping article can have a third shortest distance between edges two coated areas. The third shortest distance may not be greater than about 45 mm, such as not greater than about 42 mm, not greater than about 40 mm, not greater than about 38 mm, not greater than about 35 mm, not greater than about 33 mm, not greater than about 30 mm, not greater than about 28 mm, or even not greater than about 25 mm.

The damping article as illustrated in FIG. 1a comprising rigid panels 104 and 106, discontinuous polymer resin layer 102, and polymer resin-free spaces 108 can form a resonating system, wherein resin-free space 108 can be designed to serve to geometrically reduce the interlayer stiffness The polymer resin 102 may be disposed between two relatively flat rigid members 104 and 106. For example, the polymer resin 102 may be laminated between two rigid panels 104 and 106 to form a construction panel for use in forming walls, ceilings, or floors. For example, the rigid panels 104 or 106 may include wood, plywood, gypsum board, oriented strand board, cement board, plaster board, fiberboards, wallboard, gyproc, sheetrock, or any combination thereof. In an example, the acoustic damping article may be used to form a laminate for manufacturing walls. In another example, the acoustic damping article may be disposed between subflooring and flooring. In a further example, the acoustic damping article may be disposed between rigid members of a ceiling panel.

In another example, preformed laminates may be formed with the polymer resin. For example, the polymer resin may be applied to a surface of a first rigid panel. The surface of the second rigid panel is placed in contact with the acoustic damping article that is in contact with a major surface with the first rigid panel to form the laminate.

Particular embodiments of the above described acoustic damping article exhibit technical advantages. In particular, embodiments of the above described exhibit desirable high modal damping factors and short drying time.

Figure 1B:
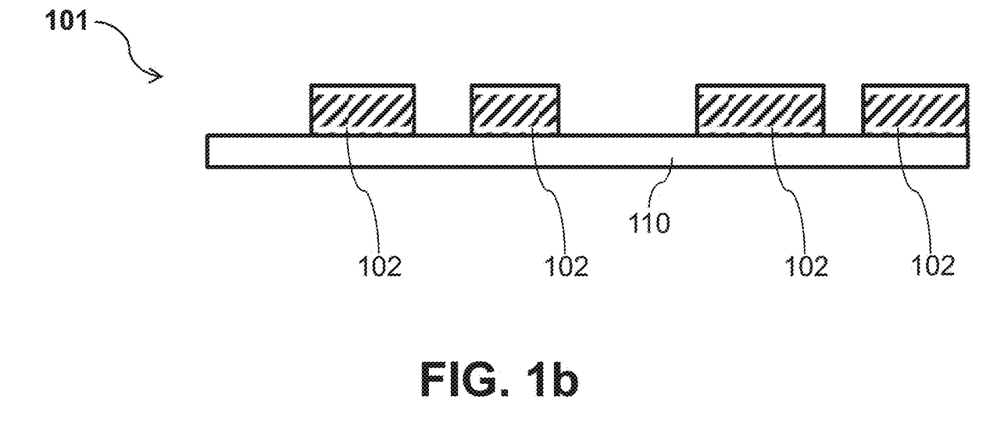
FIG. 1b. includes an illustration of viscoelastic polymer applied to a release liner.

As illustrated in FIG. 1b, prior to deployment of the polymer resin 102 onto a construction element (such as element 104 or element 106 in FIG. 1a), the polymer resin can be placed on a release liner 110, thereby forming a planar damping compound application article 101. The release liner can be a peel-off sheet. The peel-off sheet includes a polymer or paper backing sheet onto which a pattern of coated areas has been applied with polymer resin 102. In embodiments, the release liner 110 can include a polymer selected from polyethylene, polypropylene, polyimide, or any combination thereof. In one particular embodiment, the release liner consists essentially of polyethylene.

Although not illustrated in FIG. 1b, the planar damping compound application article 101 can be stored in form of roll. In embodiments, when the article 101 is in form of a roll, polymer resin 102 can be between a first major surface of release liner 110 and a second major surface of release liner 110, the second major surface being opposite to the first major surface. In another embodiment, a cover sheet can overly the polymer resin 102 and the release liner 110 (not illustrated in FIG. 1a). The cover sheet, can be made from the same material as the release liner 110 or be from a different material. In embodiments where a cover sheet is used, the planar damping compound article can be stored in form of a roll as well, wherein the cover sheet and release liner 110 are adjacent.

In one embodiment, the coated areas by polymer resin 102 further can include an adhesive layer (not illustrated in FIG. 1a). The peel-off sheet is applied onto a substrate wherein the adhesive layer or the coated areas contact the substrate. The polymer resin is sandwiched between the substrate and the backing sheet. Afterwards, the backing sheet is removed. Moreover, the polymer resin can be coated on two liners having different release formulations between the coating and each liner. That way a pattern can be stored on a roll for custom-made use on construction sites or for customer-specified sale. Measured strips can be taken from the role, one liner removed and the pattern can be applied to a construction panel, while preserving the opposing side with a liner until the second construction panel is mounted to the wall. In another embodiment, the polymer resin can also be coated on a first major surface of a liner having different release formulations between the first major surface of the liner and the second major surface of the liner, the second major surface being opposite to the first major surface.

In one further example, the acoustic damping article 100 or the planar acoustic damping compound article 101 includes a polymer resin coating 102, wherein at least one area of the coated areas is in the shape of a rectangle, a square, a triangle, a pentagon, a hexagon, a circle, a circular section, a ring, a section of a ring, a half ring, or a combination thereof. For example, the coated areas can be a rectangle abutting to a half ring, the half ring abutting to another rectangle, thereby the coated areas displaying a U-shape. The rectangle is defined by sides a and b, wherein a proportion of length (a)/length (b) can be greater than about 1, such as greater than about 2, greater than about 5, greater than about 10, greater than about 20, greater than about 50, greater than about 100, greater than about 500, greater than about 1000, or even greater than about 5000.

In another example, the acoustic damping article includes a set of coated areas which forms a pattern of stripes. The pattern can be straight stripes, wavy stripes, zig-zag stripes, parallel stripes, or any combination thereof.

Figure 4:
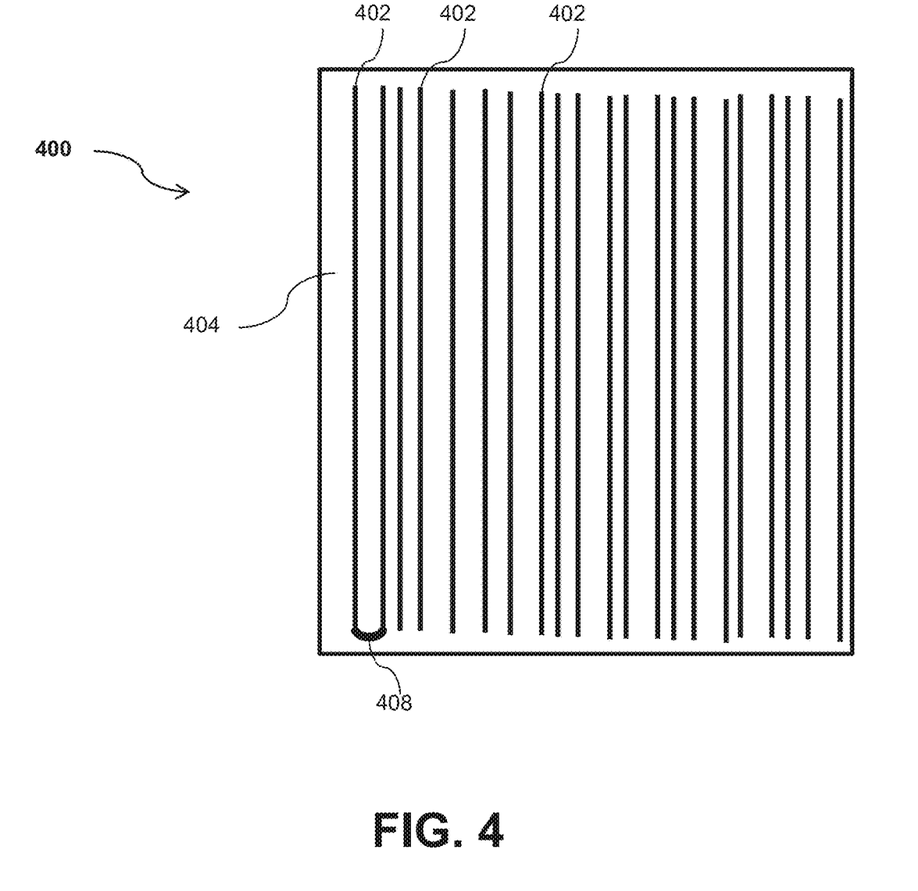
FIG. 4 includes an illustration of viscoelastic polymer applied to a surface of a construction panel as a pattern of stripes.

Such combination of stripes are disclosed in FIG. 4, where the surface of a construction panel 404 is covered with parallel stripes 402, wherein the distance between stripes vary. Furthermore, FIG. 4 shows that in a process step, the parallel stripes can be applied to the surface in one process step as a continuous stripe with U-turn or half ring 408 at the bottom or top (not disclosed).

Figure 5A:
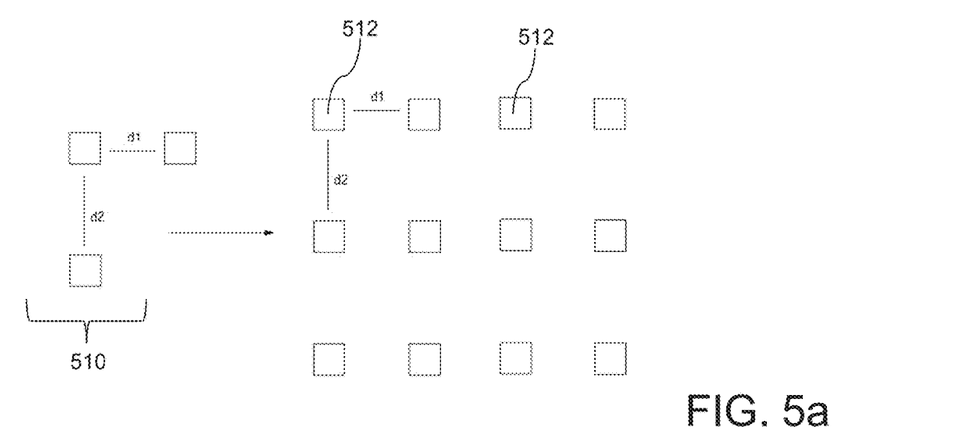
FIGS. 5a through 5c include an illustration of viscoelastic polymer patterns applied to a surface of a construction panel.
Figure 5B:
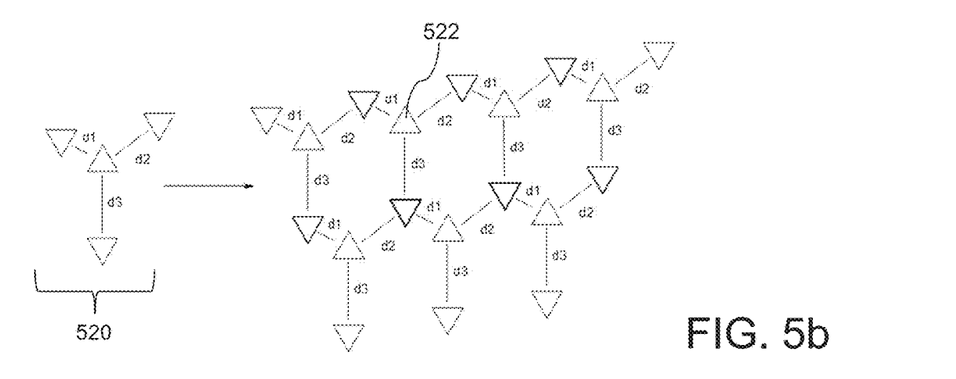
Figure 5C:
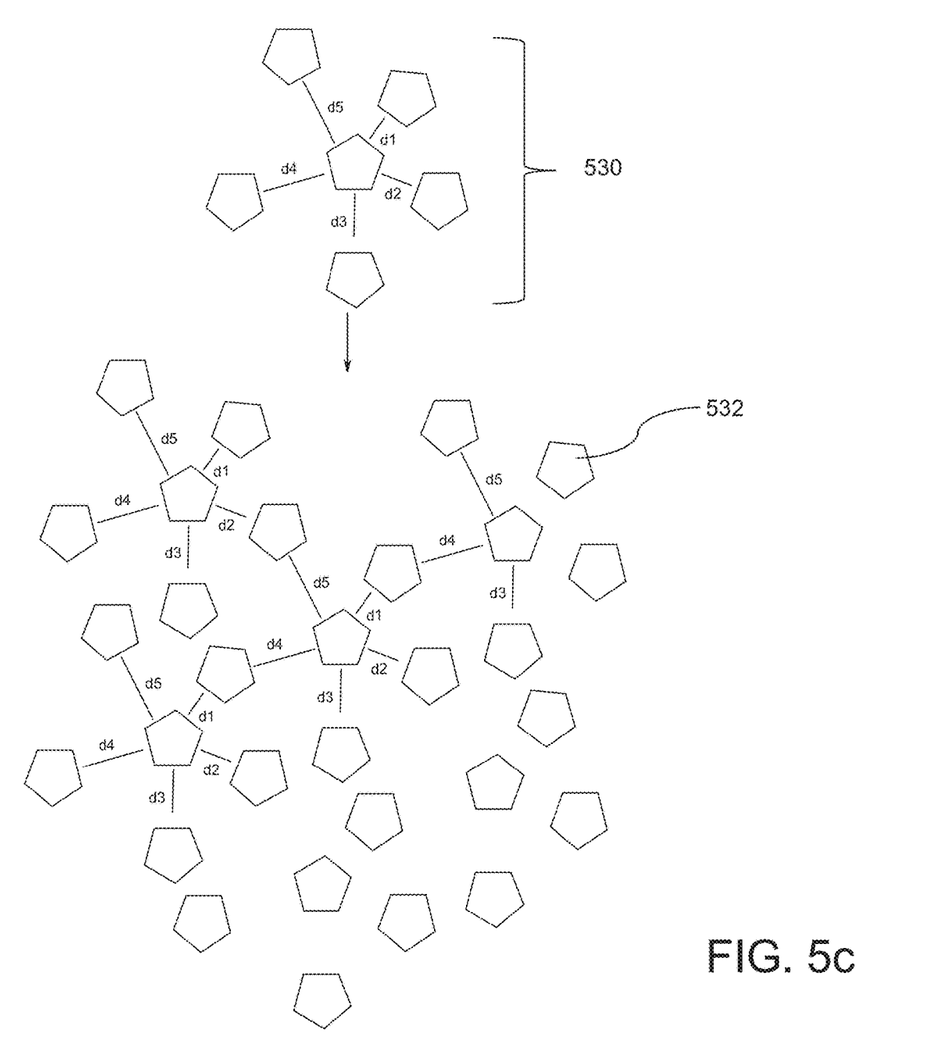

FIGS. 5a, 5b, and 5c even further disclose that various shapes of the coating 102 in FIGS. 1a and 1b and distances between resin edges can be applied in different pattern. For example, as disclosed in FIG. 5a, if the resin is applied as squares 512, then a pattern can unfold with at least two distances d1, and d2 between two edges of squares. The basic pattern 510 displays the elemental unit for the pattern. As another example, as disclosed in FIG. 5b, if the resin is applied as triangles 522, then a pattern can unfold with at least three distances d1, d2, and d3 between two edges of squares. The basic pattern 520 displays the elemental unit for the pattern. An as even one further example, as disclosed in FIG. 5c, if the resin is applied as pentagons 532, then a pattern can unfold with at least five distances d1, d2, d3, d4, and d5 between two edges of squares. The basic pattern 530 displays the elemental unit for the pattern.

It is also contemplated to combine resin shapes, e.g. squares with triangles, depending from the desired damping to be achieved at various frequencies.

Figure 6A:
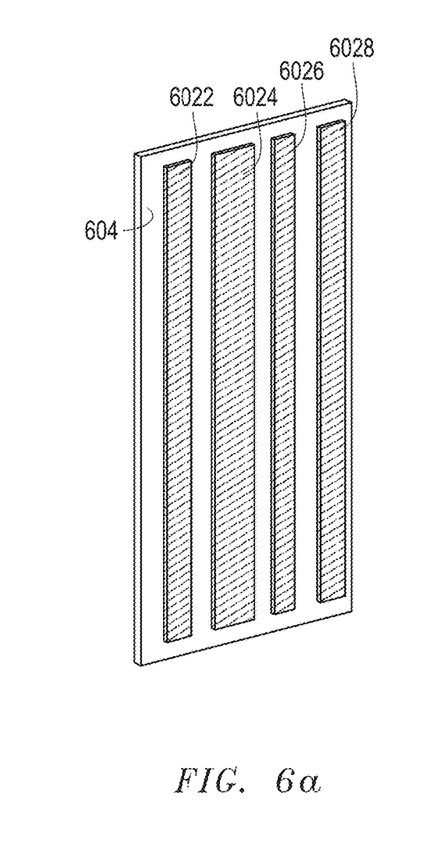
FIGS. 6a through 6e include an illustration of viscoelastic polymer patterns applied to a release liner and transferred to a construction panel.
Figure 6B:
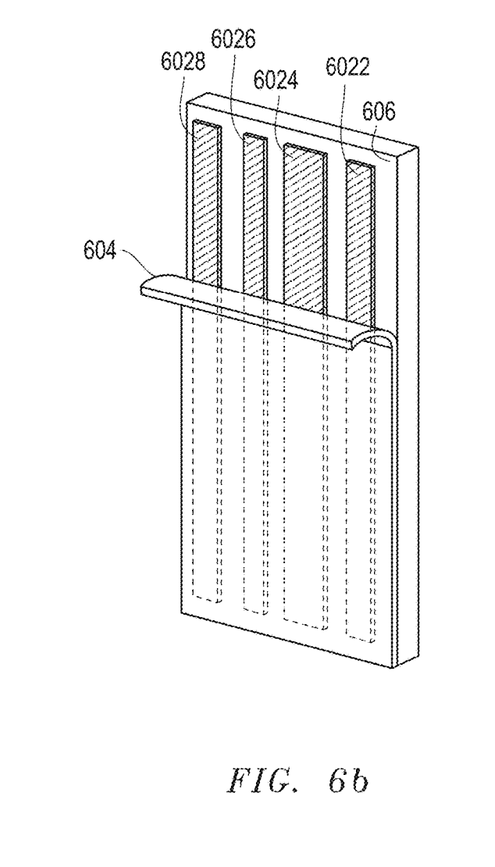
Figure 6C:
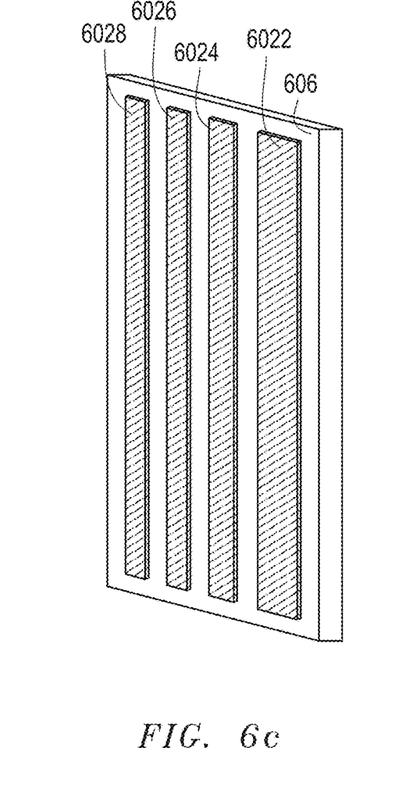

FIGS. 6a through 6c illustrate an exemplary deployment of patterned damping compound article 101 of FIG. 1b onto a construction panel to form an acoustic damping article 100 of FIG. 1a. FIG. 6a illustrates a patterned damping compound article with stripes of a polymer resin 6022-6028 on a release liner 604. In an embodiment, the stripes 6022-6028 can be different in width and cover the release liner 604 in amounts (g/m²) or percentage as discussed herein for polymer resin 102. Furthermore, the stripes 6022-6028 can be placed to include distances between major edges of two adjacent stripes as described herein. Moreover, stripes 6022-6028 can have a thickness as described for polymer resin 102. In an embodiment, the pattern on the release liner can be applied on release liner 604 and stored in form of a roll. Sections of the roll can be unwound and FIG. 6b illustrates the deployment of the patterned damping article onto a rigid panel 606. In embodiments, the pattern that was applied onto the release liner 604 can maintain its structure on the rigid panel 606. As further illustrated in FIG. 6b, the release liner 604 can be removed. For example, the release liner 604 can be peeled off. In other embodiments, it is contemplated to keep the release liner 604 in place, i.e. the release liner covers stripes 6022-6028 and the rigid panel 606. For example, the release liner can be maintained in place until the assembly is processed on a construction site, at which time the liner can be removed. FIG. 6c. illustrates the damping compound pattern deployed on the rigid panel 606 with the release liner removed.

Figure 6D:
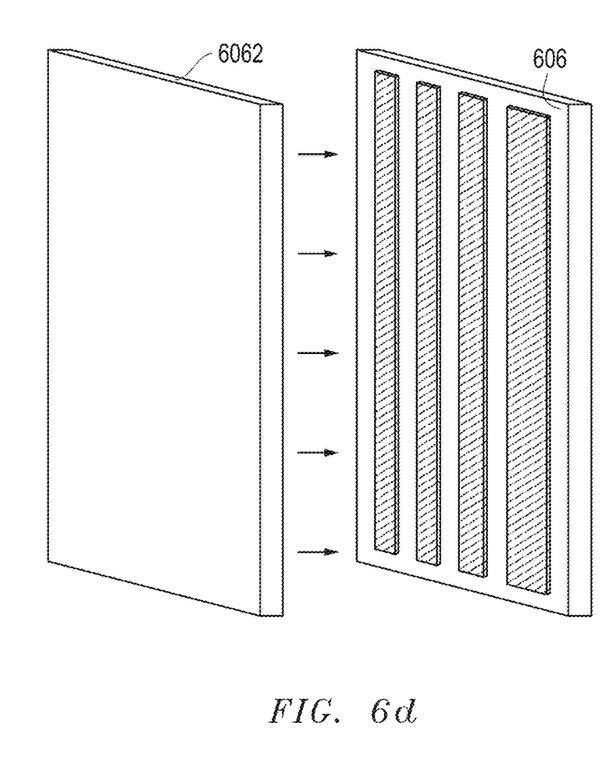
Figure 6E:
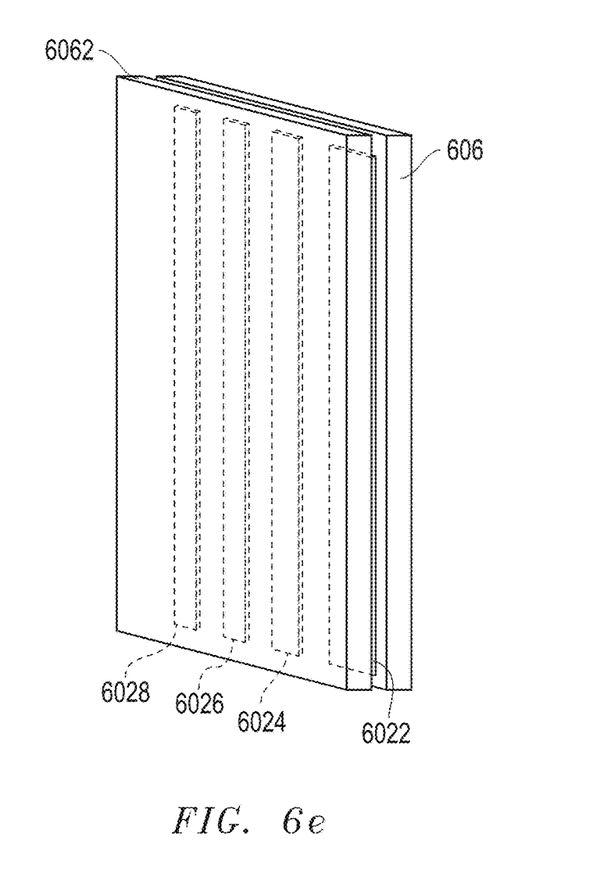

FIGS. 6d-6e illustrates the assembly of the acoustic damping composition. A second rigid panel 6062 can be overlaid with rigid panel 606 bearing stripes 6022-6028. In one embodiment, the rigid panel 6062 can be attached to the assembly with fasteners. In another embodiment, the rigid panel 6062 is attached and held by adhesion through the polymer resin present in stripes 6022-6028. FIG. 6e illustrates the finished damping composition.

In another aspect, an acoustic damping article can include a substrate. The substrate has a surface area $S_t$. The acoustic damping article further can further include a polymer resin. The polymer resin can partially coat the surface area $S_t$ with a set of n areas, $S_{c1} \ldots, S_{cn}$, wherein $n \geq 1$. The ratio of the coated areas $S_c$ over the surface area $S_t$ can be less than 1. The acoustic damping article can have a modal damping factor in the range between 50 to 850 Hz of at least about 10%. In an example, the modal damping factor in the range between 50 to 850 Hz can be at least about 20%, such as at least about 25%, at least about 30%, at least about 35%, at least about 40%, or at least about 45%. In another example, the acoustic damping article can have a modal damping factor in the range between 700 to 1500 Hz of at least about 10%, such as at least about 20%, at least about 25%, at least about 30%, at least about 35%, at least about 40%, or at least about 45%. In another example, the acoustic damping article can have a modal damping factor in the range between 1500 to 4500 Hz of at least about 10%, such as at least about 20%, at least about 25%, at least about 30%, at least about 35%, at least about 40%, or at least about 45%.

The modal damping factor can be estimated by means of a Mechanical Impedance Measurement (MIM). The MIM is a small scale test method directly inspired by a method developed for laminated glass and standardized in ISO 16940:2008. A beam sample having dimensions about 1 foot by 1 inch is cut out of the specimen to be tested and glued to a shaker at its center point. The FRF (frequency response function) of this free-free beam system is analyzed by measuring the punctual velocity and the input force. The application of the 3 dB rule to the anti-resonances of the mechanical impedance enables to determine the modal damping factor of the specimen at different frequencies.

In another embodiment, an acoustic damping article can include a substrate. The substrate can have a surface area $S_t$. The acoustic damping article can further include a polymer resin. The polymer resin can have a shear modulus G' at 1000 Hz at room temperature and a thickness t. The polymer resin coats partially the surface area $S_t$ with a set of n areas, $S_{c1} \ldots, S_{cn}$, wherein $n \geq 1$. The ratio of the coated areas $S_c$ over the surface area $S_t$ is designated p and p can be less than 1. The acoustic damping article can further include a Patterned Interlayer Stiffness (G'×p)/t can be at least about 0.7 GN/m³.

The Patterned Interlayer Stiffness (PIS) is the product of shear modulus and coverage divided by the thickness of the polymer resin layer. In a construction panel, the PIS can correlate to the modal damping factor. A constant PIS can correlate to a constant damping factor. The unit of PIS can be expressed in giganewton (GN) per cubic meters.

In another embodiment, the acoustic damping article can have a PIS of at least about 1 GN/m³, such as at least about 2 GN/m³, at least about 4 GN/m³, at least about 6 GN/m³, at least about 8 GN/m³, at least about 10 GN/m³, at least about 12 GN/m³, at least about 14 GN/m³, or even at least about 16 GN/m³. In another embodiment, the acoustic damping article can have a PIS which is not greater than about 25 GN/m³, such as not greater than about 22 GN/m³, not greater than about 20 GN/m³, not greater than about 18 GN/m³, not greater than about 16 GN/m³, not greater than about 14 GN/m³, not greater than about 12 GN/m³, not greater than about 10 GN/m³, or even not greater than about 8 GN/m³.

In yet another embodiment the percent coverage p can be at least about 0.1, such as at least about 0.2, at least about 0.3, at least about 0.4, at least about 0.5, at least about 0.6, at least about 0.7, at least about 0.8, or at least about 0.9. In another embodiment the percent coverage p can be no greater than about 0.95, such as not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, or not greater than about 0.4.

In another example, the acoustic damping article can have a ratio of coated area $S_c$ over total surface area $S_t$ which is not greater than about 0.8, such as not greater than about 0.6, not greater than about 0.5, not greater than about 0.4, not greater than about 0.3, not greater than about 0.25, not greater than about 0.2, not greater than about 0.15, or even not greater than about 0.1.

In one example, the substrate can include a wall panel, a ceiling panel, a dry wall, a tile, a subfloor, or a plastic sheet. In another example, the damping article can include a second substrate overlying the polymer resin and the original substrate. The second substrate can be the same or different from the original substrate.

In another aspect, a method of preparing a construction panel can include coating a first major surface of a first rigid panel with a polymer resin in a set of areas. The coverage of the polymer resin can be no greater than about 500 g/m².

In one embodiment, a method of preparing a construction panel can include coating a first major surface of a first rigid panel with a polymer resin in a set of areas. The coated areas can have a first shortest distance d1 between edges of two coated areas of not greater than about 25 mm.

In another embodiment, an acoustic damping article can include a substrate. The substrate can have a side with a total surface area $S_t$. The substrate can further include a polymer resin. The polymer resin can have a shear modulus G' at 1000 Hz and at room temperature. The shear modulus can be measured with a rheometer or a viscoanalyzer when the polymer resin is dried. The polymer resin can further have a thickness t. The polymer resin can partially coat the side of the substrate in a set of n areas, $S_{c1}, \ldots, S_{cn}$, wherein $n \geq 1$. The percentage coverage p is the ratio of the sum of coated areas $S_c$ over the surface area $S_t$. The percentage coverage p can be less than 1. The property of $(G' \times p)/t$ is at least 0.7 $GN/m^3$ In an example the polymer resin can be coated by spraying, brushing, plating, trowelling or stenciling. The coating can be conducted with a tool selected from a brush, a roller, a trowel, a spray gun, a caulking gun, wherein the tool is adapted for coating the surface in the set of areas and not coating the surface other than the set of areas. For example, the brush can have gaps to avoid coating a specific area between two coated areas. Likewise, a roller can have imprints, embossments, or sculptural reliefs on its surface that allows for partial coverage of a surface or coating a surface with a certain pattern. Moreover, it is contemplated that the brush can have varying bristle density along the brush's ferrule. Varying bristle density allows for applying the polymer resin at different amounts. Likewise, the roller can be prepared from various materials, such as foam polymers, that allow for different coverage of polymer resin across the length of the roll.

In another example, the trowel can have specifically designed notches. In another example, the spray gun can have a modified nozzle that allows for spraying a pattern of coated areas and uncoated areas. For example, such modification can include a set of divergent or convergent jets directing the polymer resin in certain areas while omitting other areas of the substrate.

In yet another example, the partial coating of the substrate can be done using a stencil technique. A stencil, e.g., a polymer sheet, includes cut outs of various shapes. The cut outs can be in forms of stripes, rectangles, squares, triangles, pentagons, hexagons, or any other polygons. The stencil is placed on a substrate and polymer resin is applied. After the polymer resin has been applied, the stencil is removed leaving a set of coated areas on the substrate.

In a first aspect, an acoustic damping article can include a release liner. The acoustic damping article can further include an acoustic damping composition disposed on the release liner, wherein the acoustic damping composition has an Interlayer Stiffness of at least about 1 $GN/m^3$.

In a second aspect, a construction sheet can include a release liner. The construction sheet can further include an acoustic damping composition disposed on the release liner. The acoustic damping composition can have an Interlayer Stiffness of at least about 1 $GN/m^3$. The release liner can have an average release force of not greater than about 600 grams per inch, as determined in a 180 degree peel test at a separation speed of 40 inches per minute. In instances, the release force can be no greater than about 500 grams per inch, such as than about 400 grams per inch, or not greater than about 300 grams per inch. In other instances, the release force can be at least about 200 grams per inch, such as at least about 250 grams per inch, or at least about 300 grams per inch.

In a third aspect, a construction panel can include a rigid panel having a first major surface. The construction panel can further include an acoustic damping composition disposed on the first major surface. Furthermore, a release liner can overlie the acoustic damping composition. The acoustic damping composition can have an Interlayer Stiffness of at least about 1 $GN/m^3$.

In one embodiment, the Interlayer Stiffness can be at least about 2 $GN/m^3$, at least about 4 $GN/m^3$, at least about 6 $GN/m^3$, or at least about 8 $GN/m^3$. In another embodiment, the Interlayer Stiffness can be no greater than about 20 GN/m3, not greater than about 18 $GN/m^3$, not greater than about 16 $GN/m^3$, not greater than about 14 $GN/m^3$, or not greater than about 12 $GN/m^3$.

In another embodiment, the acoustic damping composition can have a coverage on a first major surface of the release liner of at least about 0.1, such as at least about 0.2, at least about 0.3, or at least about 0.5. In yet another embodiment, the coverage of the damping composition on the first major surface of the release liner can be no greater than about 0.9, such as not greater than about 0.8, not greater than about 0.7, or not greater than about 0.5.

In one embodiment, the acoustic damping composition can form a pattern. In instances, the pattern can include a rectangle, a square, a triangle, a pentagon, a hexagon, a circle, a circular section, a ring, a half ring, or any combination thereof. In other instances, the damping composition can form a pattern of stripes. For example, the damping composition can form a pattern of rectangular stripes, wavy stripes, zig-zag stripes, parallel stripes, or a combination thereof.

In another embodiment, the acoustic damping composition includes a binder resin. The binder resin can include a urethane component in a water-based emulsion. In one instance, the binder resin further includes an acrylic component.

In one further embodiment, the acoustic damping article can include a layer overlying the acoustic damping composition. In instances, the layer can include a wall panel, a ceiling panel, a dry wall, a tile, a subfloor panel, a wood panel, a plywood panel, or a plastic sheet.

Referring to wood panels, such as wood floor panels, the inclusion of a damping layer will enable to directly damp the elements impacted by footsteps as opposed to damping arrangements where the acoustic damping layer is located in the subfloor region.

In an embodiment, a wood panel for acoustic dampened flooring comprises a laminated plank. The laminate plank can include a top layer, at least one layer viscoelastic dampening material, and at least one core layer.

The top layer is the visible part of the blank and can be made of timber, bamboo, vinyl plastic, or any other hard plastic. The viscoelastic dampening layer can be designed as described herein to provide at least 20% dampening at 100 Hz and room temperature. It is also contemplated that the viscoelastic material maintains its acoustic dampening properties while bearing the weight of equipment and furniture placed on the floor panel. Accordingly in one embodiment, the Interlayer Stiffness for the acoustic dampening material is at least about 1.5 $GN/m^3$, such as at least about 3 $GN/m^3$, at least about 6 $GN/m^3$, or at least about 9 $GN/m^3$. The stiffness can be selected to prevent the viscoelastic material from flowing under the weight of equipment or furniture. Moreover, the viscoelastic dampening material can be applied in any pattern as described herein to optimize dampening performance.

The core layer of the wood panel can be made of wood, plywood, oriented strand board (OSB), melamine resin, or any other hard material. The stacking of the layers can be symmetric or asymmetric. The plank can have a final shape including a tongue and a groove to facilitate installing and to stabilize the assembled floor.

In another embodiment, the acoustic damping article can include a plastic sheet. It is contemplated that the plastic sheet serves as a release liner. For acoustic damping composition on a release liner. It is contemplated that for such application, it is contemplated to reduce the isocyanate content of the urethane component in the viscoelastic material to improve dampening. Such result can be achieved by adding mono-hydroxyl compounds, to cap isocynates and break the polymer chain. Such mono-hydroxyl alcohols can be, e.g., Di(propylene glycol) butyl ether (DPnB).

In another instance, the release liner of the acoustic damping article can include polyethylene, polypropylene, polyimide, or any combination thereof. In one embodiment, the damping composition of the acoustic damping article, the construction sheet, or the construction panel can have a thickness of at least about 50 microns, such as at least about 75 microns, at least about 100 microns, at least about 150 microns, at least about 200 microns, at least about 250 microns, at least about 300 microns, at least about 350 microns, at least about 400 microns, at least about 450 microns, or at least about 500 microns. In other instances, the thickness can be no greater than about 5000 microns, such as not greater than about 4000 microns, not greater than about 2000 microns, not greater than about 1000 microns, not greater than about 800 microns, not greater than about 600 microns, not greater than about 500 microns, not greater than about 450 microns, not greater than about 400 microns, not greater than about 350 microns, or not greater than about 300 microns.

In one embodiment, the acoustic damping article, the construction sheet, or the construction panel can have a modal damping factor in the range between 50 to 850 Hz of at least about 10%. In instances, the modal damping factor in the range from 50 to 850 Hz can be at least about 20%, at least about 30%, or at least about 40%. In yet other embodiments, the acoustic damping article can have a modal damping factor in the range between 700 to 1500 Hz of at least about 10%. In instances, the modal damping factor in the range between 700 to 1500 Hz can be at least about 20%, at least about 25%, at least about 30%, or at least about 40%. In yet other embodiments, the acoustic damping article can have a modal damping factor in the range between 1500 to 4000 Hz of at least about 10%. In instances, the modal damping factor in the range from 1500 to 4000 Hz can be at least about 20%, at least about 25%, at least about 30%, or at least about 40%

In a fourth aspect, a method of damping a construction wall, the method can include applying an acoustic damping article onto a first major surface of a first rigid panel. The acoustic damping article can include a release liner and an acoustic damping composition disposed on the release liner. The method can further include removing the release liner. The method can further include applying a second major surface of a second rigid panel onto the acoustic damping composition to form the construction wall. Additionally, the method can include drying the construction wall until the acoustic damping composition has an Interlayer Stiffness of at least about 1 GN/m$^3$, at least about 2 GN/m$^3$, at least about 4 GN/m$^3$, at least about 6 GN/m$^3$, or at least about 8 GN/m$^3$. In another embodiment, the Interlayer Stiffness is not greater than about 20 GN/m$^3$, not greater than about 18 GN/m$^3$, not greater than about 16 GN/m$^3$, not greater than about 14 GN/m$^3$, or not greater than about 12 GN/m$^3$.

In one embodiment, the method can include that the acoustic damping composition has a coverage on the first major surface at least about 0.1, such as at least about 0.3, at least about 0.5, or at least about 0.8.

In other embodiments, applying the acoustic damping article onto the first major surface can include unwinding the acoustic damping article from a roll.

In other embodiments, the method can include that after drying the acoustic damping composition has a shear modulus G' of not greater than about 100 MPa at about 1000 Hz and at room temperature. In instances, the shear modulus G' can be no greater than about 70 MPa, such as not greater than about 50 MPa, or even not greater than about 30 MPa. In further instances, the shear modulus G' can be at least is at least about 0.2 MPa, such as at least about 1 MPa, at least about 5 MPa, or at least about 10 MPa.

EXAMPLES

Example 1

As mentioned above, Mechanical impedance measurement (MIM) is a small scale test method for assessing the damping performance and the dynamic stiffness of a multilayer panel. It is directly inspired from a similar method developed for laminated glass and standardized in ISO 16940:2008 (*Glass in building—Glazing and airborne sound insulation—Measurement of the mechanical impedance of laminated glass*).

The FRF (frequency response function) of this free-free beam system is analyzed by measuring the punctual velocity and the input force. The application of the 3 dB rule to the anti-resonances of the mechanical impedance enables to determine the modal damping factor of the specimen at different frequencies.

Figure 2:
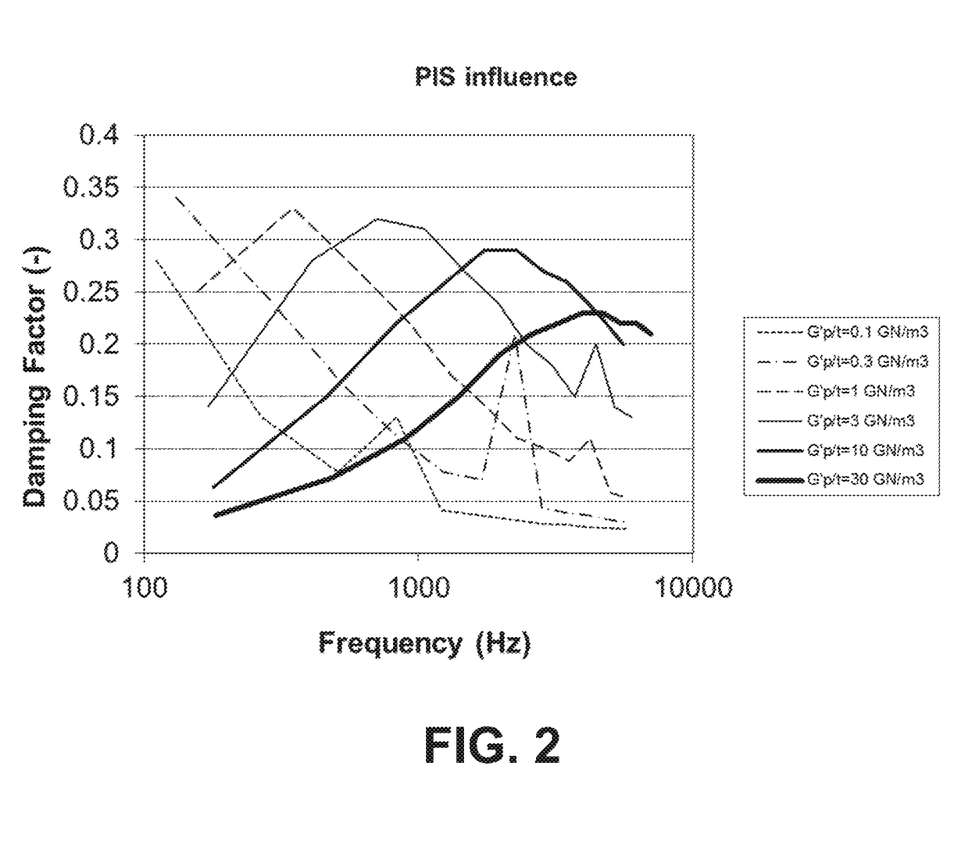
FIG. 2 includes a graph displaying damping factor dependency from the Patterned Interlayer Stiffness (PIS).

FIG. 2 displays the correlation of the Patterned Interlayer Stiffness with the damping factor. For example, taking a frequency of about 1000 Hz, the graph indicates that a maximum damping factor can be achieved using a PIS of about 3 GN/m$^3$, while maximum damping factors can be achieved at higher frequencies with higher PIS values. Since the PIS value is a property depending from the shear modulus of the glue, the percentage coverage, and the thickness, there are three variables that can be adjusted to achieve a improved damping across a construction panel.

Figure 3:
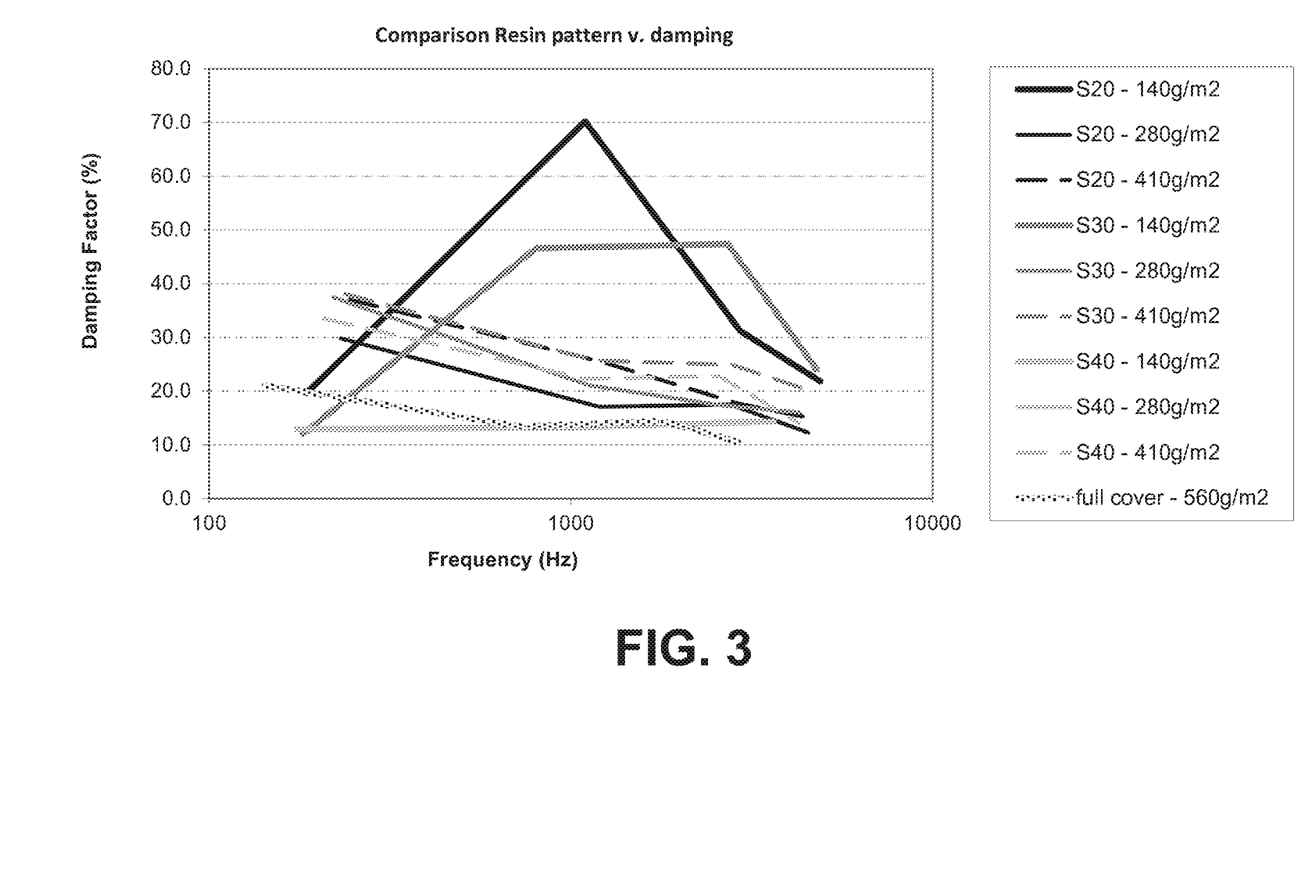
FIG. 3 includes a graph displaying damping performances for various stripe patterns over an audible frequency range.

FIG. 3 displays such effect on an example of stripes between drywall panels. Commercially available acoustic damping articles are tested for comparison with a sample formed in a manner similar to the samples of Example 1. The samples are tested by placing parallel stripes of Green Glue® formulations in various amounts at various distances on a panel of drywall and measuring the modal damping factor at various frequencies. Green Glue® is available from Green Glue Company of Granville, N.Y. Nine samples were prepared, each sample having an amount of Green Glue® of 140 g/m$^2$, 280 g/m$^2$, or 410 g/m$^2$; and each sample having stripes in a distance of 20, 30, or 40 mm. A tenth sample with a full coverage of Green Glue® was prepared. As illustrated in FIG. 3, the 20 mm spacing of the 140 g/m$^2$ (S20—140 g/m$^2$) coverage shows the highest damping of about 70% at about 1000 Hz. Also interesting, damping of the 30 mm spacing at the 140 g/m$^2$ (S30—140 g/m$^2$) coverage was better at higher frequencies, while coverage of samples higher than 140 g/m$^2$ shows better damping at frequencies lowest frequencies. From this example, it is shown that combining parallel stripes in various distances, e.g., combining S20 with S30 can result in an improved modal damping factor.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An acoustic damping article comprising:
    a release liner; and
    an acoustic damping binder resin disposed on the release liner,
    wherein the acoustic damping binder resin partially coats the side in a set of n areas, $S_{c1}, \ldots, S_{cn}$,
    wherein n≥1 and a ratio of the sum of coated areas $S_c$ over the surface area $S_t$ is less than 1,
    wherein the acoustic damping binder resin has a Patterned Interlayer Stiffness of at least about 1 GN/m³.

2. The acoustic damping article according to claim 1, wherein the Patterned Interlayer Stiffness is at least about 2 GN/m³.

3. The acoustic damping article according to claim 1, wherein the acoustic damping binder resin has a ratio of coverage of the acoustic damping composition on a first major surface of the release liner of at least about 0.1.

4. The acoustic damping article according to claim 3, wherein the ratio of coverage of the acoustic damping binder resin on the first major surface of the release liner is not greater than about 0.9.

5. The acoustic damping article according to claim 1, wherein the acoustic damping binder resin forms a pattern.

6. The acoustic damping article according to claim 5, wherein the pattern includes a rectangle, a square, a triangle, a pentagon, a hexagon, a circle, a circular section, a ring, a half ring, or any combination thereof.

7. The acoustic damping article according to claim 5, wherein the acoustic damping binder resin forms a pattern of stripes.

8. The acoustic damping article according to claim 7, wherein the acoustic damping binder resin forms a pattern of rectangular stripes, wavy stripes, zig-zag stripes, parallel stripes, or a combination thereof.

9. The acoustic damping article according to claim 1, wherein the acoustic damping binder resin comprises a urethane component in a water-based emulsion.

10. The acoustic damping article according to claim 9, wherein the acoustic damping binder resin further comprises an acrylic component.

11. The acoustic damping article according to claim 1, further comprising a layer overlying the acoustic damping binder resin, wherein the layer comprises a wall panel, a ceiling panel, a dry wall, a tile, a subfloor panel, a wood panel, a plywood panel, or a plastic sheet.

12. The acoustic damping article according to claim 1, wherein the release liner comprises polyethylene, polypropylene, polyimide, or any combination thereof.

13. The acoustic damping article according to claim 1, wherein the acoustic damping article has a modal damping factor of at least about 10% as indicated by MIM in the range between 50 to 850 Hz.

14. The acoustic damping article according to claim 1, wherein the acoustic damping article has a modal damping factor of at least about 10% as indicated by MIM in the range between 700 to 1500 Hz.

15. The acoustic damping article according to claim 1, wherein the acoustic damping article has a modal damping factor of at least about 10% as indicated by MIM in the range between 1500 to 4000 Hz.

16. A construction sheet comprising the acoustic damping article of claim 1, wherein the release liner has an average release force of not greater than about 600 grams per inch, as determined in a 180 degree peel test at a separation speed of 40 inches per minute.

17. The construction sheet according to claim 16, wherein the acoustic damping binder resin forms a pattern.

18. A construction panel comprising:
    a rigid panel having a first major surface;
    an acoustic damping binder resin disposed on the first major surface; and
    a release liner overlying the acoustic damping binder resin;
    wherein the acoustic damping binder resin partially coats the side in a set of n areas, $S_{c1}, \ldots, S_{cn}$;
    wherein n≥1 and a ratio of the sum of coated areas $S_c$ over the surface area $S_t$ is less than 1; and
    wherein the acoustic damping binder resin has a Patterned Interlayer Stiffness of at least about 1 GN/m³.

19. The construction panel according to claim 18, wherein the rigid panel comprises a wall panel, a ceiling panel, a dry wall, a tile, a subfloor panel, a wood panel, a plywood panel, or a plastic sheet.

* * * * *